United States Patent [19]

Yost

[11] Patent Number: 4,911,139

[45] Date of Patent: Mar. 27, 1990

[54] LIQUID FUEL WICK SYSTEM

[75] Inventor: Charles E. Yost, Menomonie, Wis.

[73] Assignee: University of Wisconsin-Stout Manufacturing Laboratory, Menomonie, Wis.

[21] Appl. No.: 378,781

[22] Filed: Jul. 12, 1989

Related U.S. Application Data

[63] Continuation-in-part of Ser. No. 307,751, Feb. 8, 1989.

[51] Int. Cl.⁴ ............................................. F24C 5/04
[52] U.S. Cl. ......................................... 126/45; 126/96; 431/150; 431/324; 431/344
[58] Field of Search ............. 126/45, 46, 47, 96, 126/95, 50, 48, 49; 431/130, 144, 146, 150, 298, 315, 320, 324, 322, 344; 362/161, 163

[56] References Cited

U.S. PATENT DOCUMENTS 914,900  3/1909  Turner et al. .................... 431/324
2,774,235  12/1956  Ruetz .............................. 431/146

FOREIGN PATENT DOCUMENTS 190317  7/1956  Fed. Rep. of Germany ...... 431/150
685361  1/1953  United Kingdom ................ 431/150

*Primary Examiner*—James C. Yeung
*Attorney, Agent, or Firm*—Cushman, Darby & Cushman

[57] ABSTRACT

A closure for a liquid or a semi-liquid fuel can having an ignitable wick is provided. The wick is mounted to the can closure with a coil spring structure so that the wick can be depressed and extended relative to the upper surface of the can closure. A recessed portion is defined in the upper surface of the canned closure for receiving the wick in its depressed condition and the compressed wick is retained therewithin with a peelable seal. Removal of the peelable seal allows the wick and coil stem assembly to extend to an operating position wherein the wick can be easily ignited.

4 Claims, 3 Drawing Sheets 4,911,139

LIQUID FUEL WICK SYSTEM

The present invention is a continuation in part of earlier application Ser. No. 07/307,751, filed Feb. 8, 1989 pending.

BACKGROUND OF THE INVENTION

1. Field of the Invention

The present invention relates to liquid fuel containing cans and, in particular, to a closure top which insures a fluid-tight closure prior to use while providing easy access to the wick of the canned fuel system. The present invention further relates to a compressible and extendable wick for a cooking fuel system.

2. Description of the Related Art

Some conventional can for liquid or semi-liquid fuel are provided with a wick which extends upwardly from the top of the can and is covered prior to use by a flexible plastic cap which frictionally engages a stem, for example, defined about the base of the wick at its juncture with the can. A disadvantage of such wick and cap systems is that the seal provided by the plastic wick cap is generally not fluid tight and, accordingly, the liquid or semi-liquid fuel disposed within the can will leak from the periphery of the wick when the can is tipped or turned up-side-down during handling. The flammable nature of the fuel disposed within the can presents obvious hazards should the fuel leak in this manner. In addition, evidence of fuel leakage from such products renders the same unsalable.

It would therefore be desireable to provide a can top closure which provides a fluid tight seal for a wick structure prior to use and yet is easily opened without requiring tools or an extraordinary amount of strength and agility.

A further deficiency with wicked closures for semi-liquid or liquid fuel containing cans is that the wick structure is mounted immediately adjacent to upper surface of the can thus increasing the likelihood that the flame will be conveyed down the wick and into the interior of the can thereby presenting a fire hazard. Furthermore, the rope or other fiber wick typically provided for fuel cans, lacking in inherent rigidity or any support structure, can be compressed against the upper surface of the can thus making lighting the wick and proper burning of the same difficult.

It would therefore be desireable to provide a wick mounting structure in a can top closure which facilitates lighting the wick and the proper burning of the same without risking migration of the flame into the interior of the fuel can in use and which conveniently locates the flame adjacent the object being heated.

SUMMARY OF THE INVENTION

It is an object of the present invention to provide a can closure which overcomes the deficiencies of the prior art noted above by providing a peelable fluid-tight seal which sealingly encloses the wick of a liquid or semi-liquid fuel containing can so that leakage of the flammable contents prior to use will be prevented.

It is a further object of the present invention to provide a wick structure which facilitates ignition of the wick fiber and proper burning of the same in use as well as proper location of the wick adjacent the object being heated.

These and other objects are realized in accordance with the present invention by providing a cooking fuel containing can wherein a wick element extends through and is secured to a centrally disposed aperture, the top closure of the can having a concave portion in which the central aperture is defined and through which the wick assembly extends. A peelable seal is secured to the top closure peripherally of the concave portion so as to provide a fluid tight seal for the wick assembly. Furthermore, the wick assembly is configured so as to be compressible and extendable from a storage position within the concave portion of the closure of the fuel can to an operating position wherein the end of the wick to be ignited extends vertically outwardly from the concave or recessed portion of the can closure.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings, all of which form a part of this specification, wherein like referenced numerals designate corresponding parts in the various figures.

DETAILED DESCRIPTION OF THE PRESENTLY PREFERRED EXEMPLARY EMBODIMENT

Figure 1:
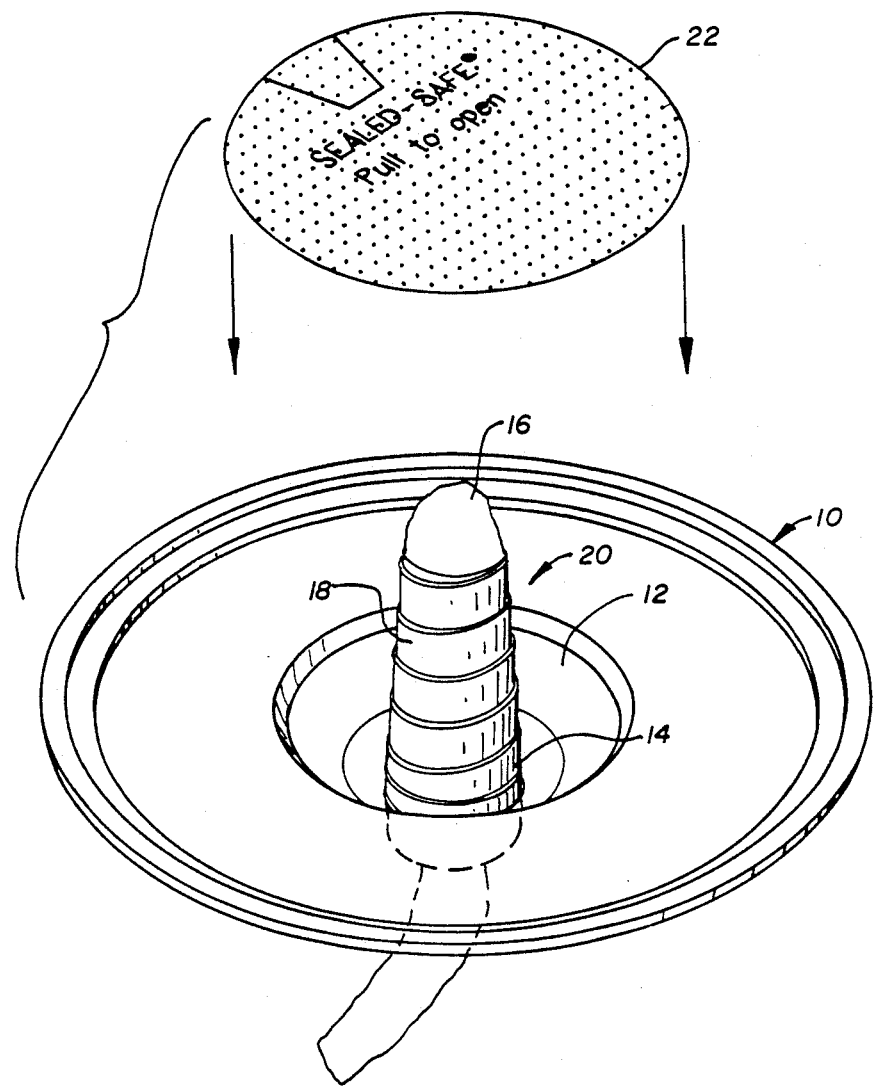
FIG. 1 is a exploded perspective view showing a wick system and peel-back closure provided in accordance wit the present invention.

As shown in FIG. 1, in accordance with the present invention, a concave portion 12 is defined in the fuel can top 10 and a central aperture 14 is defined therethrough. A wick element 16 is inserted through the central aperture 14. In the illustrated embodiment, a piece of sheet metal 18 is wrapped about the wick 16 so as to define a telescoping coil spring support structure 20 for the wick. Thus, the sheet metal 18 provides a wick support structure 20 which is compressible so that the wick 16 and sheet metal 18 can be compressed and disposed within the concave portion 12 and, when released, will extend upwardly to the position shown in FIGS. 1 and 2 wherein the wick 16 and hence the flame is positioned properly relative to the bottom of a vessel being heated. The provision of a sheet metal material 18 wrapped about the wick 16 eliminates heat transfer through the wick 16 and thus localizes the heat and the flame at the tip of the wick 16. In this manner, the amount of fuel burned can be limited to the fuel drawn up int the exposed wick portion.

Prior to use, the wick 16 and support structure 20 are compressed (FIG. 3) so as to be disposed adjacent the surface of the concave portion 12 and a peelable seal such as the peelable foil seal 22 shown in FIG. 1 is adhesively secured about the periphery of the concave portion 12. Providing such a sealed closure, then, insures a fluid-tight seal of the container prior to use and thereby prevents leakage of the fuel through the wick 16 or the central aperture 14 to the exterior of the can during transport and/or storage. When it is desired to use the canned fuel, however, the peelable seal 22 can be simply pulled off to expose the wick 16.

Figure 2:
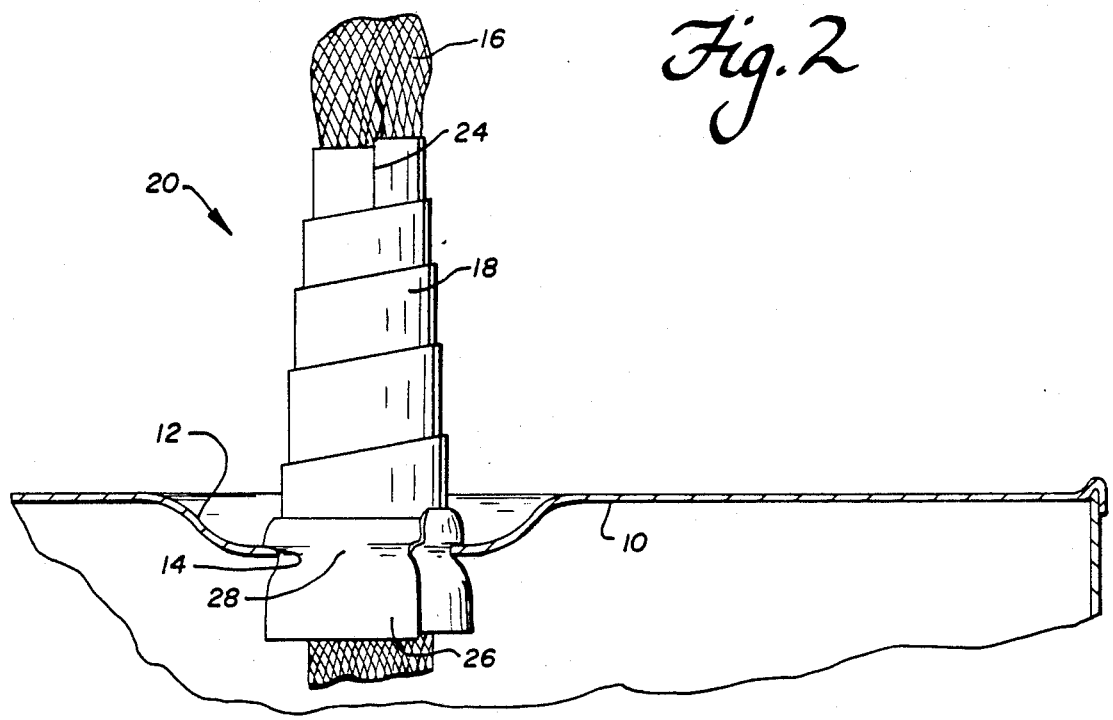
FIG. 2 is a side elevational view, partly in cross-section and partly broken away for clarity, of a spring mounted wick assembly provided in accordance with the present invention in its extended, operating position.
Figure 3:
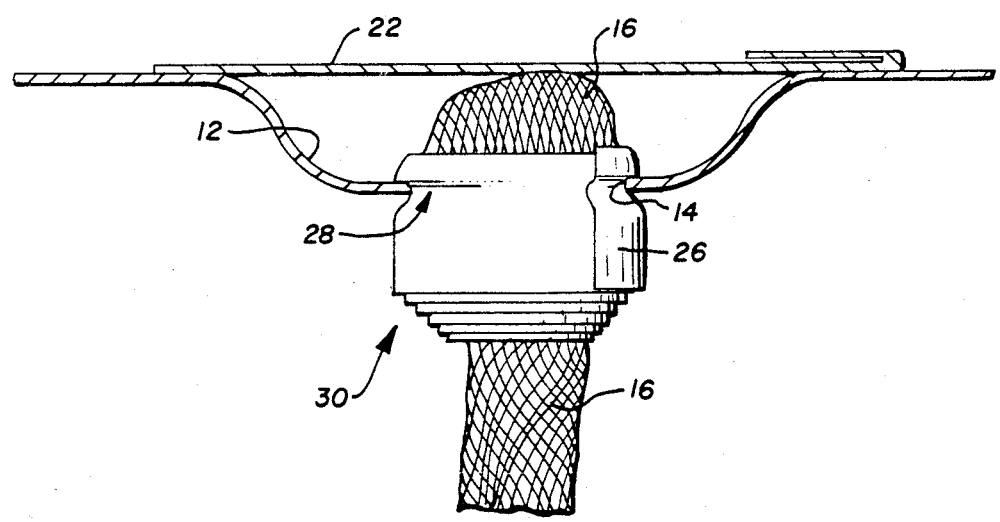
FIG. 3 is a side elevational view, partly in cross-section and partly broken away for clarity, showing the embodiment of FIG. 2 in its depressed, storage position.

Thus, in the embodiment of FIGS. 2 and 3, the sheet metal or foil material 18 is wrapped as a spiral 20 about the wick material 16 with the inner end 24 of the material 18 crimping the doubled overwick 16 and the outer end 26 of the material 18 engaging the aperture 14 in the concave portion 12 of the can lid 10. As can be seen a depressed or grooved portion 28 can be defined in the sheet metal material 18 which engages the edges of the aperture 14 through the can lid 10. Wrapping the sheet metal material 18 about the wick in this manner defines a telescoping coil stem 20 whereby pressing downwardly on the wick from vertically above compresses the coil stem 20 of sheet metal material 18 to the disposition shown in FIG. 3. The peelable cover 22 can then be placed over the recessed wick 30 and will hold the wick/coil combination 30 in its depressed position, as described above. Removal of the cover 22 prior to use allows the compressed coil to return to its uncompressed configuration and thus to extend the upper end of the wick to its operating position shown in FIG. 2.

Figure 4:
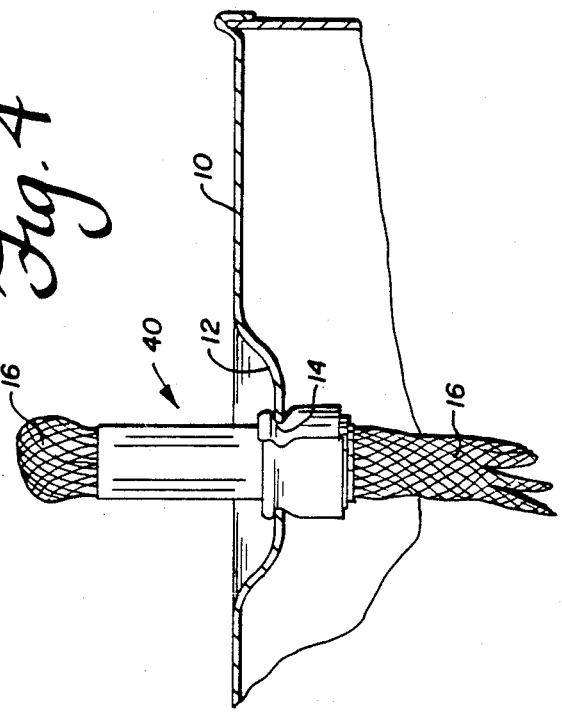
FIG. 4 is a side elevational view, partly in cross-section and partly broken away for clarity, of a second embodiment of the wick assembly provided in accordance with the present invention in its extended, operating position.
Figure 5:
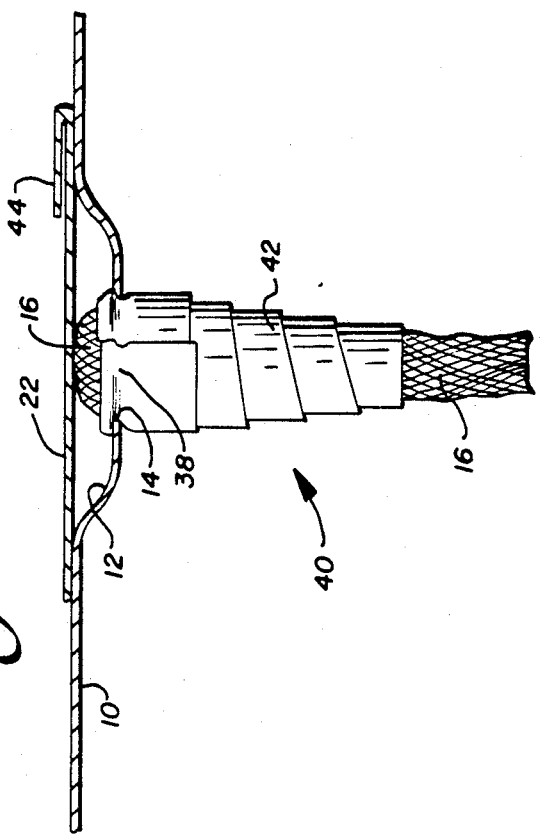
FIG. 5 is a side elevational view, partly in cross-section and partly broken away, showing the embodiment of FIG. 4 in its depressed, storage position.
Figure 6:
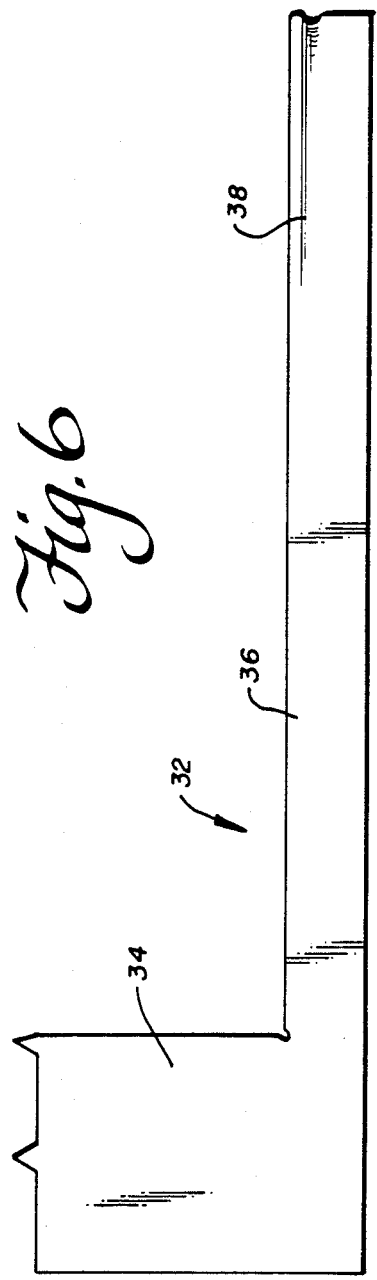
FIG. 6 is a plan view of a spring like wick support element provided in accordance with the present invention.

An alternate embodiment of the present invention is shown in FIGS. 4-6. In this embodiment, the sheet metal 32 has a relatively wide portion 34 and an elongated strip 36 as shown in FIG. 6. The tail end 38 of the elongated strip 36 has a depression 38 defined therein or a similar formed wall section such that the coiled sheet metal will define a groove or depression for engaging the periphery of the aperture 14 in the fuel can closure top 10, as will become more apparent below.

With reference to FIG. 4, the wide portion 34 of the sheet metal material is crimped about the folded over wick material 16 and is wrapped circumferentially of the wick 16. The wick and coil assembly 40 is inserted into the central aperture 14 of the fuel can lid 10. Thus, the portion of the wick to be ignited is disposed at the vertically upper end of the wide portion 34 of the metal sheet and the elongated strip 36 of the metal sheet is coiled adjacent the base of the wide portion 34 and engages the can closure 10.

As shown in FIG. 5, when the wick and sheet metal structure of FIG. 4 is depressed relative to the concave portion 12 so that the ignitable portion of the wick 16 is within the concave portion 12, the wide portion 36 of the sheet metal is disposed within a telescoping coil 42 within the fuel can. The wick and metal coil structure 40 are held in the depressed, storage position by the peelable closure 22. At the time of use, the closure 22 is removed by pulling, for example, on the tab 44. Removal of the closure 22 allows the coil spring structure to extend the stem and wick combination 40 to the operating position of FIG. 4.

While the invention has been described in connection with what is presently considered to be the most practical and preferred embodiments, it is to be understood that the invention is not to be limited to the disclosed embodiment, but, on the contrary, is intended to cover various modifications and equivalent arrangements included within the spirit and scope of the appended claims.

What is claimed is:

1. A liquid fuel can having a bottom wall, side walls, and a top wall closure defining therebetween a liquid fuel receiving chamber, a concave portion defined centrally of said top wall closure, a central aperture defined through said top wall closure, a wick extending through said central aperture so as to extend into said concave portion, a coil spring means mounted in surrounding relation to said wick element and engaging said central aperture, said coil spring means being collapsible and extendable from a disposition wherein an uppermost end of said wick is within the confines of said concave portion to a position wherein said uppermost end of said wick extends outwardly from said concave portion, respectively, said coil spring means comprising an elongated piece of sheet metal operatively coupled at a first end thereof to said wick adjacent said uppermost end of said wick and wrapped in a spiral configuration along a portion of the length of said wick, a second end of said sheet metal material being engaged with the periphery of said central aperture so that said coil metal and wick combination are compressible from said spiral configuration to a disposition wherein said sheet metal material is wrapped in a circumferential configuration about said wick and said wick is within the confines of said concave portion, and means for retaining said coil spring element and wick coupled thereto within the confines of said concave portion prior to use.

2. A fuel can as in claim 1, wherein said means for retaining comprises a peelable closure secured to the upper surface of said top closure peripherally of said concave portion.

3. A fuel can having a bottom wall, side walls, and a top wall closure defining therebetween a liquid fuel receiving chamber, a concave portion defined centrally of said top wall closure, a central aperture defined through said top wall closure, a wick extending through said central aperture so as to extend into said concave portion, a coil spring means mounted in surrounding relation to said wick element and engaging said central aperture, said coil spring means being collapsible and extendable from a disposition wherein an uppermost end of said wick is within the confines of said concave portion to a position where in said uppermost end of said wick extends outwardly from said concave portion, respectively, said coil spring means including a sheet metal element having first, relatively wide end portion and a second, relatively narrow elongated end portion, said relatively wide end portion being wrapped in surrounding relation to said wick and said elongated end portion being wrapped circumferentially of said wide portion so that in its extended position said wick and relatively wide end portion of said sheet metal extend vertically upwardly from said central aperture while said elongated end portion is disposed circumferentially of said wide portion and in said compressed configuration the elongated portion of said sheet metal is extended in the form of a spiral into the can interior with said wide portion within the confines of said spiral, and means for retaining said coil spring element and wick coupled thereto within the confines of said concave portion prior to use.

4. A fuel can as in claim 3, wherein said means for retaining comprises a peelable closure secured to the upper surface of said top closure peripherally of said concave portion.

* * * * *